July 4, 1939.  H. WESSON  2,164,760

FLUSH VALVE

Filed Oct. 3, 1938

Inventor
Harold Wesson
By Roberts, Cushman and Woodbury.
his Attys.

Patented July 4, 1939

2,164,760

UNITED STATES PATENT OFFICE 2,164,760

FLUSH VALVE

Harold Wesson, Springfield, Mass., assignor to Smith and Wesson, Inc., Springfield, Mass., a corporation of Massachusetts Application October 3, 1938, Serial No. 232,921

3 Claims. (Cl. 137—93)

While certain features of the present invention may be used in various kinds of valves the invention is particularly applicable to flush valves which close automatically in response to a gradual increase in pressure within a cylinder or the like containing a piston for closing the valve.

Objects of the invention are to provide a valve which is simple and economical to construct, which can be quickly and easily installed, which is reliable and durable in operation, which can be readily adjusted to close more or less quickly, which is self-aligning, which can be actuated by swinging a control handle in any direction, and which is generally superior to prior valves of the type referred to.

In one aspect the invention involves a loose mounting of the aforesaid cylinder in the valve casing to permit the valve, which is connected with a piston in the cylinder, to be self-aligning with its valve seat. The piston may also fit loosely in the cylinder to afford the aforesaid gradual increase in pressure by leakage between the piston and cylinder, thereby avoiding the necessity of leakage ducts, check valves, etc.

In another aspect the aforesaid cylinder is adjustable toward and from the valve seat to vary the volume of the space in the cylinder which is unoccupied by the piston when the valve is seated, thereby to vary the time required for the valve to close automatically in response to the aforesaid leakage. To facilitate this adjustment the valve casing is provided with a removable cap affording ready access to the cylinder.

In still another aspect of the invention the piston is formed in two parts with a space therebetween for a control valve and a passageway leading to the interior of the cylinder through said space, whereby the valve may be opened by relieving the pressure in the cylinder with the control valve. The control valve is preferably unseated by a tipping movement effected by a stem extending outwardly through said passageway. The stem may be actuated through suitable mechanism extending out through the valve casing to a handle which is preferably capable of universal movement.

Figure 1:
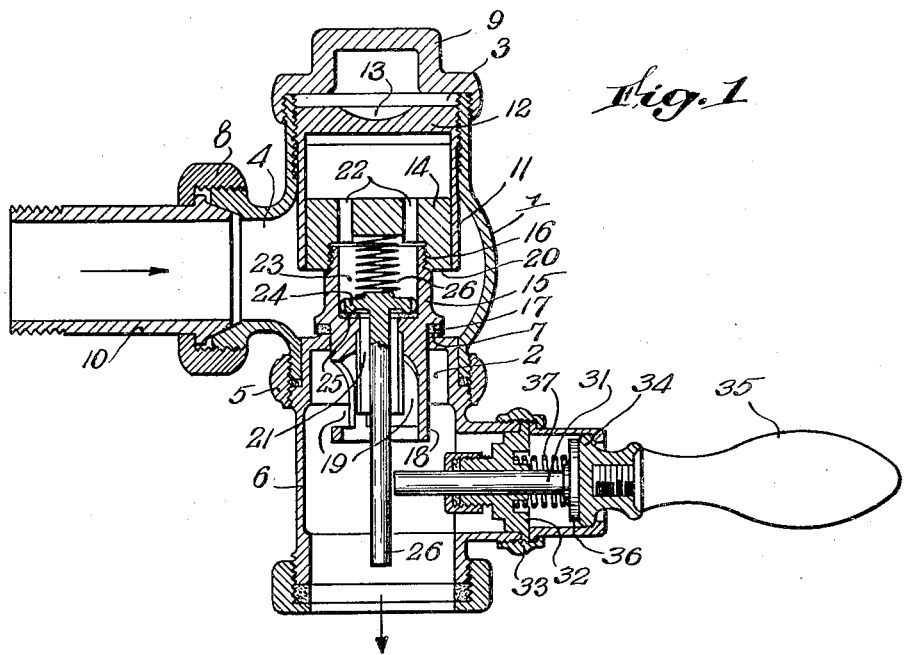
Figure 2:
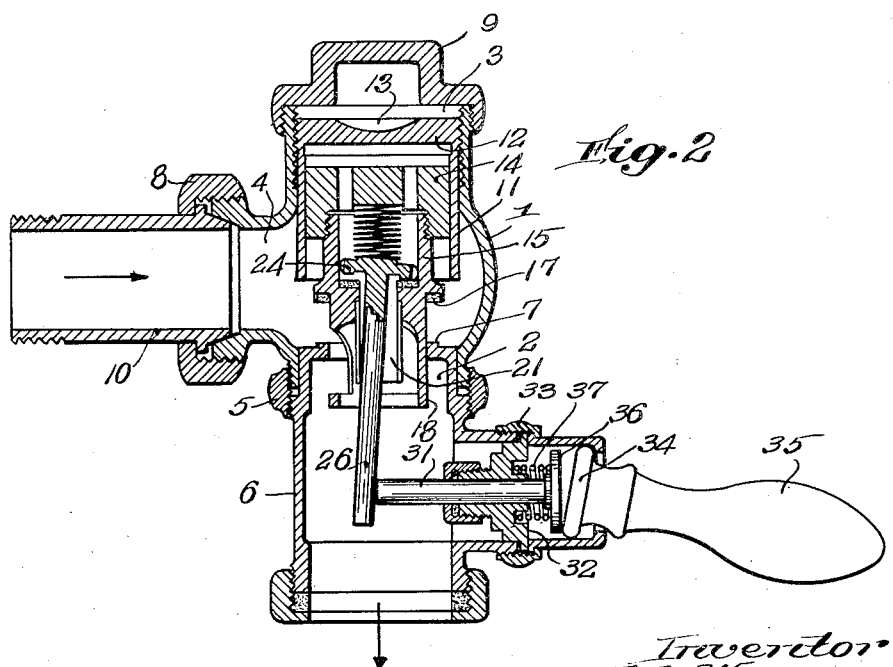

For the purpose of illustration a typical embodiment of the invention is shown in the accompanying drawing in which Fig. 1 is an axial section through a valve in closed position; and Fig. 2 is a similar view through the valve after the exterior handle has been actuated and the valve has partly opened.

The particular embodiment of the invention chosen for the purpose of illustration comprises a T-shaped casing 1 having an outlet 2 at its lower end, an opening 3 in its upper end and an inlet 4 at the side. Connected to the outlet 2 by a coupling 5 is a casing 6 having a valve seat 7 at its upper end and, in one side, mechanism hereinafter described for controlling the valve. The inlet 4 may be connected to an inlet pipe 10 by means of a union 8. The opening 3 is preferably closed by a cap 9 threaded over the top of the casing 1.

Threaded into the opening 3 is a cylinder 11 which preferably fits loosely in the casing so that it may tilt slightly to bring its axis in alignment with the center of the valve seat 7. The lower end of the cylinder 11 is open and the upper end is closed by means of an integral wall 12 having a groove 13 to receive a coin, screw driver or other instrumentality for threading the cylinder 11 inwardly or outwardly in relation to the casing. Disposed within the cylinder 11 is a piston comprising an upper part 14 and a lower part 15 threaded together as indicated at 16. The lower part 15 comprises a valve 17 engageable with the seat 7 and also a tubular extension 18 depending loosely through the valve seat, the extension 18 having openings 19 to facilitate the flow of water when the piston rises to the top of the cylinder, thereby lifting the openings 19 until their upper ends are disposed above the valve seat. The upper part 14 of the piston fits loosely within the cylinder so that water may leak from the inlet side between the piston and cylinder, thereby to force the piston downwardly until the valve 17 seats on 7. When the pressure within the cylinder is relieved as hereinafter described the piston is lifted by water pressure pressing upwardly on the annular surface 20.

To relieve the pressure in the cylinder 11 the piston is provided with a passageway comprising a duct 21 in the lower part 15, two ducts 22 in the upper part 14 and a space 23 between the two parts. Mounted in this space is a control valve 24 yieldingly held against the seat 25 by a spring 26. Depending from the valve 24 through the duct 23 is a stem 26 by which the control valve may be tipped to relieve the pressure in the cylinder as aforesaid.

The mechanism for tipping the control valve 24 comprises a plunger 31 reciprocating horizontally in the cap 32 held in place by a union 33 which also secures a sleeve 34 having an opening in its outer end to receive the handle 35. The plunger 31 has a head 36 pressed outwardly by a spring 37 against the inner end of the handle 35. The outer end of the sleeve 34 is turned inwardly to hold the handle in place while permitting the handle to be swung upwardly or downwardly or in any other direction. Swinging movement of the handle forces the plunger inwardly against the action of the spring, thereby tipping the control valve 24 sufficiently to relieve the pressure in the cylinder through the passageway 21, 22 and 23 faster than water can leak into the cylinder around the piston.

When the aforesaid passageway is open the upward pressure on the annular surface 29 exceeds the downward pressure on the upper end of the piston by an amount greater than the weight of the piston, whereby the valve opens quickly. After the valve is thus opened and the handle 35 is released, thereby permitting the control valve 24 to resume its normal position shown in Fig. 1, the valve gradually closes in response to water leaking into the cylinder between the piston and the cylinder. The extent to which the valve may open, and therefore the time required for the closing movement of the valve, may be varied by removing the cap 9 and threading the cylinder either upwardly or downwardly.

It should be understood that the present disclosure is for the purpose of illustration only and that this invention includes all modifications and equivalents which fall within the scope of the appended claims.

I claim:

1. A flush valve comprising a conduit having a valve seat, a tubular portion approximately coaxial with said valve seat, a cylinder in said tubular portion, a piston in said cylinder, and a valve connected to said piston for engagement with said seat, said cylinder having its outer periphery loosely threaded in said tubular portion to permit automatic alignment of said valve with said seat.

2. A flush valve comprising a casing having an outlet, an opening opposite the outlet and an inlet intermediate said outlet and opening, a valve seat in said outlet, a cylinder loosely threaded into said opening with an open end directed toward said seat, a cap for detachably closing said opening, a piston loosely fitted in the cylinder, a valve connected to said piston for engagement with said seat, said piston comprising two parts attached together with a space therebetween and having a passageway leading to the interior of the cylinder through said space, a control valve in said space, and means extending outwardly through said passageway for unseating said control valve.

3. A flush valve comprising a casing having an outlet, an opening opposite the outlet and an inlet intermediate said outlet and opening, a valve seat in said outlet, a cylinder loosely threaded into said opening with an open end directed toward said seat, the other end of the cylinder being closed, a cap for detachably closing said opening, a piston loosely fitted in the cylinder, a valve connected to said piston for engagement with said seat, said piston comprising two parts attached together with a space therebetween and having a passageway leading to the interior of the cylinder through said space, a control valve in said space, and means extending outwardly through said passageway for unseating said control valve.

HAROLD WESSON.